US010046761B2

(12) United States Patent
Meyer et al.

(10) Patent No.: US 10,046,761 B2
(45) Date of Patent: Aug. 14, 2018

(54) DETERMINING AN ACTIVATION CRITERION FOR A BRAKE APPLICATION

(71) Applicant: WABCO GmbH, Hannover (DE)

(72) Inventors: Rudiger Meyer, Hannover (DE); Dirk Sandkuhler, Bad Sassendorf (DE); Christian Sulzbacher, Hannover (DE)

(73) Assignee: WABCO GmbH, Hannover (DE)

( * ) Notice: Subject to any disclaimer, the term of this patent is extended or adjusted under 35 U.S.C. 154(b) by 275 days.

(21) Appl. No.: 14/762,524

(22) PCT Filed: Nov. 30, 2013

(86) PCT No.: PCT/EP2013/003616
§ 371 (c)(1),
(2) Date: Jul. 22, 2015

(87) PCT Pub. No.: WO2014/114311
PCT Pub. Date: Jul. 31, 2014

(65) Prior Publication Data
US 2015/0360687 A1 Dec. 17, 2015

(30) Foreign Application Priority Data
Jan. 25, 2013 (DE) .................. 10 2013 001 229

(51) Int. Cl.
*B60W 30/09* (2012.01)
*B60T 7/22* (2006.01)
(Continued)

(52) U.S. Cl.
CPC .............. *B60W 30/09* (2013.01); *B60T 7/22* (2013.01); *B60T 8/17558* (2013.01);
(Continued)

(58) Field of Classification Search
None
See application file for complete search history.

(56) References Cited

U.S. PATENT DOCUMENTS 7,283,902 B2    10/2007 Heider et al.
8,170,739 B2     5/2012 Lee
(Continued)

FOREIGN PATENT DOCUMENTS

DE    69027917 T2    6/1991
DE    4302527 A1     8/1993
(Continued)

OTHER PUBLICATIONS

Yoshiaki Kuwata et al., 'Real-time Motion Planning With Applications to Autonomous Urban Driving', Sep. 2009, IEEE Transactions on Control Systems Technology, vol. 17 No. 5.*

*Primary Examiner* — Jonathan M Dager
*Assistant Examiner* — Garrett F Evans
(74) *Attorney, Agent, or Firm* — Leydig, Voit & Mayer, Ltd.

(57) ABSTRACT

To determine an activation criterion for outputting brake signals to a vehicle brake system at least one object in the environment of the vehicle is detected. A determination is made whether the vehicle is on a collision course with the object. If so, at least one avoidance criterion is determined, wherein an S-shaped avoidance trajectory of the vehicle is determined, from which at least one extreme value of a lateral acceleration of the vehicle is determined. The extreme value is compared with at least one threshold value. The avoidance criterion is met if the associated extreme value falls below the threshold value, and the activation criterion for the brake application is not met as long as the avoidance criterion is met.

23 Claims, 3 Drawing Sheets

(51) Int. Cl.
  *B60T 8/1755* (2006.01)
  *B60W 10/184* (2012.01)
  *B60W 10/20* (2006.01)
  *B60W 30/095* (2012.01)

(52) U.S. Cl.
  CPC .......... *B60W 10/184* (2013.01); *B60W 10/20* (2013.01); *B60W 30/095* (2013.01); *B60T 2201/022* (2013.01); *B60W 2550/308* (2013.01); *B60W 2720/125* (2013.01)

(56) References Cited

U.S. PATENT DOCUMENTS

| | | |
|---|---|---|
| 2003/0220738 A1 | 11/2003 | Abe et al. |
| 2004/0193374 A1 | 9/2004 | Hac et al. |
| 2005/0060071 A1 | 3/2005 | Winner |
| 2008/0243378 A1 | 10/2008 | Zavoli |
| 2010/0228427 A1* | 9/2010 | Anderson ............ B60W 30/09 701/31.4 |
| 2010/035035 | 9/2010 | Hikaru et al. |
| 2011/0288774 A1* | 11/2011 | Bengtsson ............... G08G 1/16 701/301 |

FOREIGN PATENT DOCUMENTS

| | | |
|---|---|---|
| DE | 690 27 917 T2 | 2/1997 |
| DE | 10012737 B4 | 9/2001 |
| DE | 10154321 B4 | 7/2002 |
| DE | 103 52 596 A1 | 5/2004 |
| DE | 10336986 B4 | 3/2005 |
| DE | 10 2005 002 760 A1 | 8/2005 |
| DE | 102004028404 A1 | 1/2006 |
| DE | 10 2004 056 120 A1 | 5/2006 |
| DE | 102004056027 A1 | 5/2006 |
| DE | 102005002504 A1 | 7/2006 |
| DE | 10 2006 034 254 A1 | 4/2007 |
| DE | 102008062916 A1 | 6/2010 |
| DE | 10 2009 012 226 A1 | 9/2010 |
| DE | 10 2009 020 649 A1 | 11/2010 |
| DE | 102010028384 A1 | 11/2010 |
| DE | 10 2010 006 214 A1 | 8/2011 |
| DE | 102010006214 A1 | 8/2011 |
| DE | 10 2010 018 038 A1 | 10/2011 |
| DE | 102010018038 A1 | 10/2011 |
| DE | 102010023164 A1 | 12/2011 |
| DE | 102010049351 A1 | 4/2012 |
| EP | EP0778507 A2 | 6/1997 |
| EP | EP1057159 B1 | 12/2000 |
| EP | EP1223093 B1 | 7/2002 |
| EP | EP1263634 B1 | 12/2002 |
| EP | EP1303421 B1 | 4/2003 |
| EP | EP1409310 B1 | 4/2004 |
| EP | EP1409311 B1 | 4/2004 |
| EP | EP1926646 B1 | 6/2008 |
| EP | EP1926647 B1 | 6/2008 |
| EP | EP1926654 B1 | 6/2008 |
| JP | 07179140 | 7/1995 |
| JP | 2003341501 | 12/2003 |
| JP | 2004517004 | 6/2004 |
| JP | 2007253745 | 10/2007 |
| JP | 2009286279 | 12/2009 |
| JP | 2010519550 | 6/2010 |
| JP | 2012052956 | 3/2012 |
| WO | WO 99/42973 | 8/1999 |
| WO | WO03006291 | 1/2003 |
| WO | WO2006042512 | 4/2006 |
| WO | WO 2008/031662 | 3/2008 |
| WO | WO2012/119596 A1 | 9/2012 |
| WO | WO2014114310 A1 | 7/2014 |

* cited by examiner

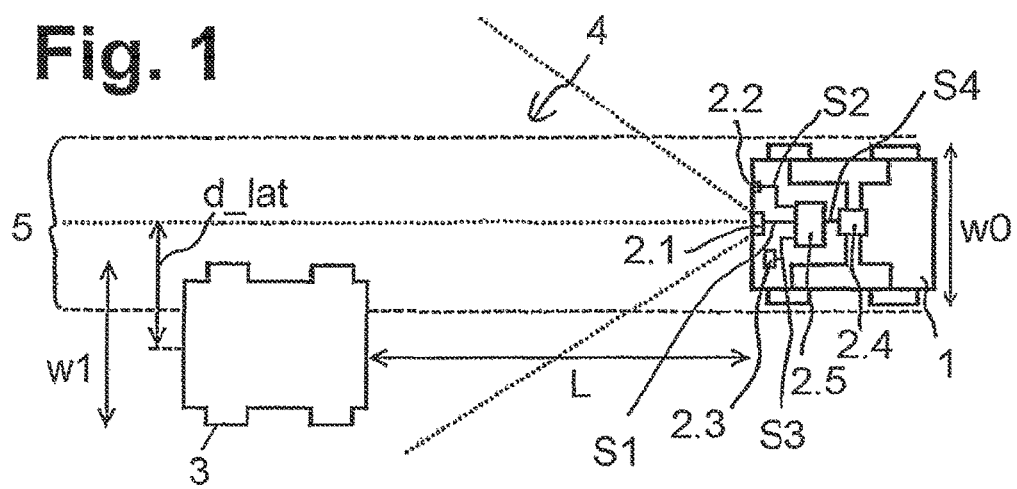
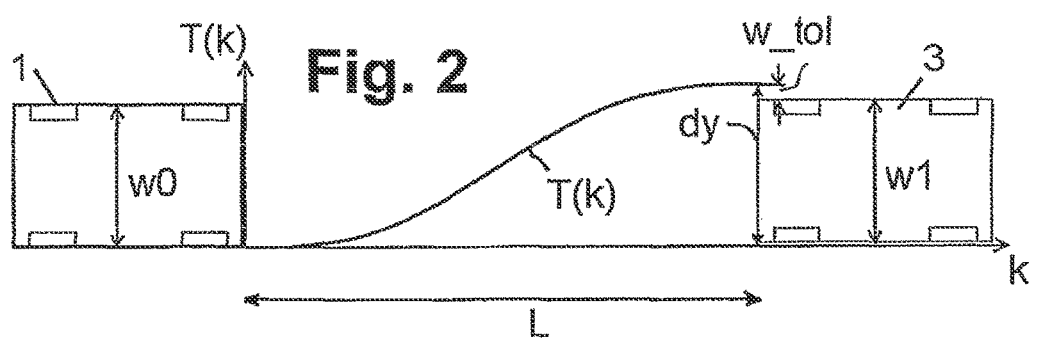
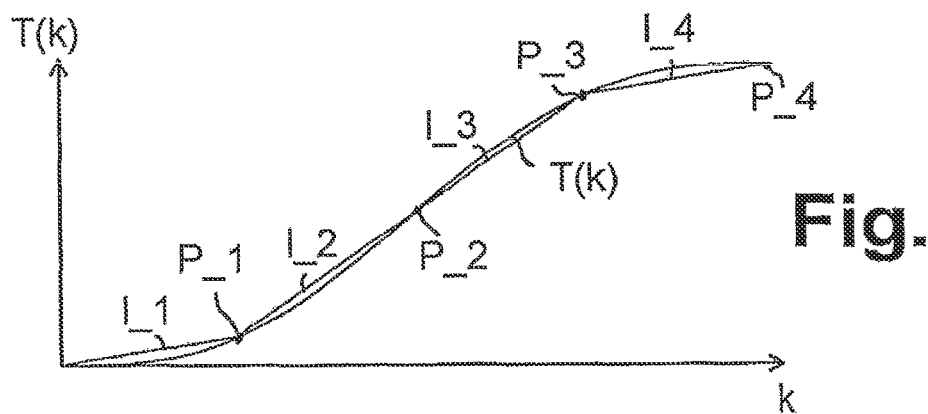

DETERMINING AN ACTIVATION CRITERION FOR A BRAKE APPLICATION

FIELD OF THE INVENTION

The present invention generally relates to emergency brake systems.

BACKGROUND OF THE INVENTION

Emergency brake systems of the general type under consideration are used in commercial vehicles to effect a brake application upon detection of an imminent collision with an object. The term "collision" means an impact of the vehicle with the object, which can be moving, such as another vehicle that is traveling ahead of the vehicle, or stationary, such as a road sign or a non-moving vehicle.

In order to assess whether the vehicle is on a collision course with an object, once the object is determined to be in the environment of the vehicle, the future driving behavior of the vehicle with regard to the object is determined. In so doing, consideration is given to the dynamic parameters of the vehicle and also of the object, including whether the vehicle can still avoid the object or whether an impact can be prevented by means of a brake application, in other words whether the driver can theoretically still prevent the collision. If the driver is no longer able to prevent a collision, an emergency brake application is performed automatically.

A brake system of this general type is described in DE 10 2010 006 214 A1. Once an object is detected in the environment of the vehicle, the last possible moment to intervene for a brake application is determined by taking into consideration the prevailing dynamics of the associated vehicle and the object and also the reaction time of the driver. Based thereon, a brake application is initiated in order to prevent a collision and to reduce the consequences of a collision. Furthermore, the last possible moment for avoiding a collision is taken into consideration by assuming that the avoidance trajectory of the associated vehicle corresponds to a parabola or a circle.

EP 1 057 159 B1 describes a method for preventing a collision, wherein a calculation is performed to determine a minimum distance that is required with respect to a vehicle ahead in order at a maximal possible vehicle deceleration to avoid a collision with the vehicle ahead. The relative velocity and the relative acceleration between the two vehicles are taken into consideration. Furthermore, a minimum distance is also taken into consideration that is required for a possible avoidance maneuver (steering the vehicle past the vehicle ahead). With reference to these two distances, an emergency brake application is initiated in the event of a possible collision.

SUMMARY OF THE INVENTION

Generally speaking, it is an object of the present invention to provide a method for determining an activation criterion for a brake application, and an emergency brake system for performing the method, which enhance vehicle safety.

In accordance with various embodiments of the present invention, the environment of the associated vehicle is initially observed, and, upon detection of an object in the environment, a determination is made as to whether the associated vehicle is on a collision course with the object. In order to observe the environment, it is possible to use, for example on-board distance sensors or a camera system and it is possible to detect from their signals, as is generally known, a distance and also dynamic properties of the object, for example the velocity and the acceleration. It is thus possible by way of example to determine whether the object is a moving or stationary road user or a stationary object, for example a road sign.

In order to check whether the associated vehicle is on a collision course, the relative velocities and the relative movements with respect to one another are taken into consideration in order to estimate whether a collision is at all imminent. For this purpose, it is possible, for example, to extrapolate the prevailing trajectories of the associated vehicle and of the object in order to detect whether the two trajectories intersect. In order to determine the dynamic behavior of the associated vehicle, it is possible to use an on-board sensor system, for example a GPS system, acceleration sensors or velocities sensors. It is likewise feasible to use rain sensors in order for example to be able to take into consideration in addition the grip of the tires on the road surface.

If it is detected that the associated vehicle is on a collision course with the object, an avoidance criterion is determined. The avoidance criterion indicates whether it is still theoretically possible for the vehicle driver to steer the vehicle past an object by means of a steering maneuver. For this purpose, an avoidance trajectory for the associated vehicle is determined based upon the vehicle behavior at the respective point in time, and an assessment is made as to whether the associated vehicle that will be travelling on this avoidance trajectory in the future will make contact with the object or not, that is, whether avoidance is theoretically possible or not. The term "trajectory" in this case refers to a spatial trajectory, that is, a mathematical description of a possible future travel path of the associated vehicle.

The avoidance trajectory can be assumed to be an S-shaped trajectory that describes the avoidance behavior of the associated vehicle as precisely as possible. Particular consideration is given to the fact that the associated vehicle after the avoidance maneuver returns essentially to the same alignment it was in prior to the avoidance maneuver, wherein the alignment relates to the vehicle path in which the associated vehicle was moving prior to the avoidance maneuver. The vehicle path of the associated vehicle is described as the path along which the associated vehicle is travelling, wherein not only the preceding travel path can be taken into consideration but it also possible to extrapolate a future travel path by means of a prediction process with reference to the prevailing vehicle data.

When moving along a straight road, the vehicle path is essentially along an axis, so that an avoidance trajectory is determined in which the associated vehicle is aligned essentially parallel to the vehicle path after the avoidance maneuver. When performing an avoidance maneuver in a curve with a constant curve angle, the vehicle path follows the curve profile and an avoidance trajectory is determined in which the associated vehicle after the avoidance maneuver is aligned essentially in a tangential manner with respect to the vehicle path prior to the avoidance maneuver, so that the associated vehicle after the avoidance maneuver merely continues to follow the curve profile in a different traffic lane.

S-shaped trajectory preferably means a trajectory that comprises at least one turning point that corresponds mathematically to a change of algebraic sign in the curvature of the trajectory. If, by way of example, an avoidance maneuver on a straight section is considered, in which the vehicle driver turns the steering wheel first to the right and subsequently back to the left (moving over to the right-hand traffic lane), then the avoidance trajectory comprises a turning point during the change of the steering movement from the right to the left.

In order to simplify the calculation of the avoidance trajectory when negotiating a curve, the avoidance trajectory can also be determined in polar coordinates. This has the advantage that the avoidance trajectory can be determined in a simpler manner based upon the curve angle that has been negotiated. As is generally known, a polar coordinate system is determined by means of a curve angle and a curve radius in order, for example, to be able to describe trigonometric functions in a simpler manner.

An S-shaped avoidance trajectory of this type can be described preferably by means of a function that comprises as an additional term, by way of example a trigonometric function, such as by means of a sliding sine (T(k)~k–sin(k)). It is possible to introduce additional scale parameters, for example the distance between the associated vehicle and the object, a width of the associated vehicle and the object and a lateral displacement between the middle axis of the object and the associated vehicle, so that the avoidance trajectory can be defined unambiguously based upon the scale parameter.

It is possible, when determining the scale parameters, to take into consideration that the detected object still moves in the region of the avoidance trajectory during the avoidance maneuver, for example by accelerating or steering to the side, as a consequence of which the distance and the lateral displacement between the object and the vehicle change. For this purpose, it is also possible, when determining the avoidance trajectory, to take into consideration the transverse velocity and the acceleration of the object at the point in time at which the avoidance trajectory is determined. Advantageously, this also makes it possible to take into consideration in the avoidance trajectory a predicted travel path of the object.

In accordance with an embodiment of the present invention, a maximum transverse acceleration that acts on the associated vehicle if the vehicle is moving along the avoidance trajectory is additionally taken into consideration when determining the avoidance criterion. For this purpose, the curvature or the curvature function of the avoidance trajectory is preferably considered, wherein at the site or the sites at which the curvature is at its maximum, the transverse acceleration that is acting upon the associated vehicle is also at its maximum. It is used to determine the extreme values of the curvature function that can arise from the first derivative of the curvature function and to calculate the transverse acceleration of the associated vehicle at these sites and to compare the transverse acceleration with at least one threshold value. For example, the threshold value can be selected to represent the maximum transverse acceleration at which the associated vehicle loses grip on one side with the road surface.

In accordance with an embodiment of the present invention, the avoidance trajectory is only fulfilled if an avoidance trajectory can be found and the maximum transverse acceleration on this avoidance trajectory is below the threshold value, that is, the driver can theoretically still perform an avoidance maneuver without the vehicle tilting to the side. This has the advantage that an avoidance trajectory is not taken into consideration for an avoidance maneuver on which excessively high transverse accelerations act upon the associated vehicle.

Preferably, further avoidance criteria can be taken into consideration, for example whether the associated vehicle is maneuvered into an oncoming traffic lane or whether there are other vehicles in the proximity of the associated vehicle and thus it is also therefore not possible to perform an avoidance maneuver.

Based upon the avoidance criterion, an activation criterion is determined, wherein upon fulfilling the activation criterion an automatic brake application is initiated in the associated vehicle. The activation criterion is not fulfilled as long as the avoidance criterion is still fulfilled, so that a brake application is only initiated if it is no longer possible with the theoretical assumptions to perform an avoidance maneuver.

Preferably, the activation criterion is still dependent upon a braking criterion that is fulfilled as long as the driver can still perform a brake application or the longitudinal acceleration of the associated vehicle is above a specific value.

Advantageously, an automatic brake application is really only initiated if there is no other possibility for the driver to avoid the collision. A simple check is performed as to whether it is theoretically still possible to perform an avoidance maneuver while maintaining parameters, wherein a function that can be managed in a mathematically simple manner and can be calculated in a simple manner, even when negotiating curves, and from which it is possible to determine the maximum transverse accelerations, even when negotiating curves, is used as an avoidance trajectory.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below on the basis of exemplary embodiments illustrated in the accompanying drawings, in which:

FIG. 1 illustrates a vehicle on a collision course with at least one object, the vehicle equipped with an emergency brake system according to an embodiment of the present invention;

FIG. 2 illustrates an avoidance trajectory of a vehicle and a detected object;

FIG. 3 illustrates a linear approximation of an avoidance trajectory;

LIST OF REFERENCE CHARACTERS

Figure 4:
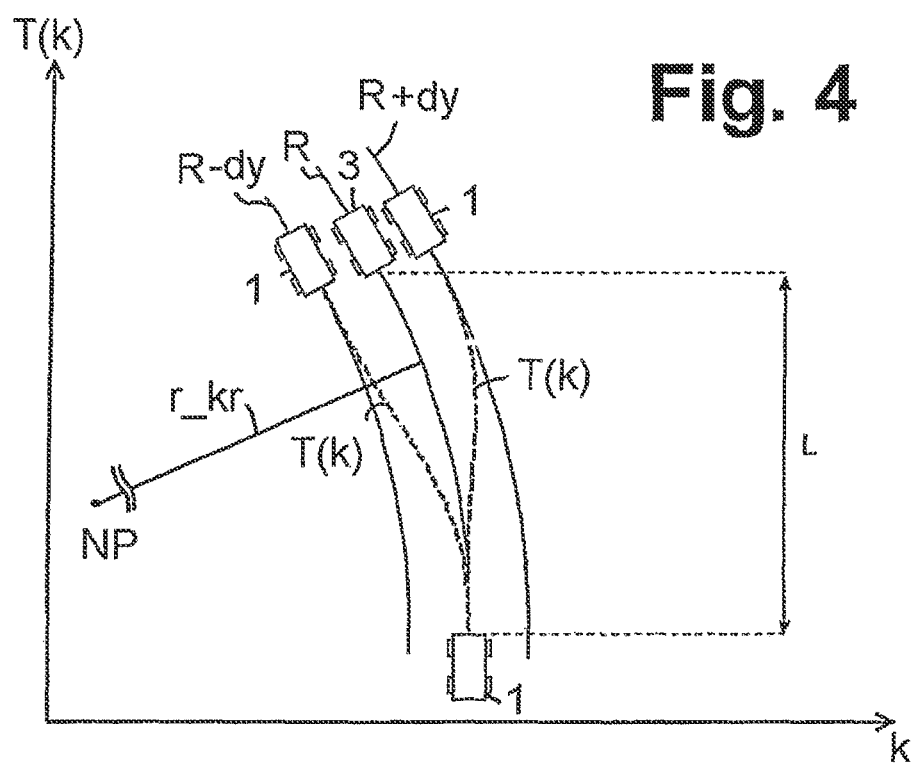
FIG. 4 illustrates a vehicle on a collision course with an object while negotiating a curve.

| | |
|---|---|
| 1 | Associated vehicle |
| 2.1 | Camera system |
| 2.2 | Proximity sensor |
| 2.3 | Sensor system |
| 2.4 | Brake system |
| 2.5 | ECU |
| 3 | Object |
| 4 | Environment |
| 5 | Vehicle path |
| A | Travel direction |

-continued

| | |
|---|---|
| a_max | maximum transverse acceleration |
| a_quer | Transverse acceleration |
| a_long | Longitudinal acceleration |
| a_thresh_1, 2 | Threshold values |
| a, b, c | Scale parameters |
| d_lat | lateral/perpendicular displacement of the middle point - axis Object - Associated vehicle |
| dt | Period of time |
| k | Trajectory parameter |
| K_avoid | Avoidance criterion |
| K_act | Activation criterion |
| K_F | Vehicle path criterion |
| K_brake | Brake criterion |
| Kappa | Curvature of T(k) |
| Kappa_max_1, Kappa_max_2 | Extreme values of the curvature |
| L | Distance: Object - Associated vehicle in the travel distance A |
| l_i; i = 1 . . . 4 | Connecting straight lines |
| NP | Zero point |
| OR | Object area |
| P_i; i = 1 . . . 4 | Points on the connecting straight lines l_i |
| Phi | Circle angle |
| R | Curve angle |
| r_kr | Distance: Associated vehicle - Zero point |
| r_v | Relative velocity: Object - Associated vehicle |
| r_a | Relative acceleration: Object - Associated vehicle |
| s | Travel path covered |
| S1 | Signal camera - ECU |
| S2 | Signal proximity sensor - ECU |
| S3 | Signal sensor system - ECU |
| S4 | Signal ECU - Brake system |
| T(k) | Avoidance trajectory |
| v | Velocity of the associated vehicle |
| v_0 | Velocity prior to the avoidance maneuver |
| w0 | Width of the associated vehicle |
| w1 | Width of the object |
| WP | Turning point |
| w_tol | Tolerance width |
| x_max_1 | x-value of the extreme value Kappa_max_1 |
| x_max_2 | x-value of the extreme value Kappa_max_2 |

DETAILED DESCRIPTION OF THE PREFERRED EMBODIMENTS

The associated vehicle 1, preferably a commercial vehicle, such as a lorry, comprises in accordance with FIG. 1 a camera system 2.1, a proximity sensor 2.2, a sensor system 2.3, a brake system 2.4 and an ECU 2.5. The ECU 2.5 receives signals S1-S3 from the elements 2.1, 2.2, 2.3, processes the signals and transmits signals S4 to the brake system 2.4.

The sensor system 2.3 determines the driving dynamic characteristics of the associated vehicle 1 and can comprise, for example, a GPS system, velocity sensors, acceleration sensors or rain sensors. The camera system 2.1 and the proximity sensor 2.2 are capable of observing an environment 4 of the associated vehicle 1 and detecting individual objects 3. The dynamic characteristics, by way of example the velocity or the acceleration, of the detected object 3 are determined either directly from the camera system 2.1 or from the proximity sensor 2.2, or the signals S1, S2 that have been received are transmitted to the ECU 2.5 or to a further processing unit in the associated vehicle 1 for further processing.

Consequently, it is possible to detect initially whether an object 3 is located in the environment 4 of the associated vehicle 1 and at which relative velocity r_v and relative acceleration r_a the object 3 is moving with respect to the associated vehicle 1. Moreover, it is possible to determine a distance L and also a lateral displacement d_lat with respect to the detected object 3, wherein the distance L represents the distance from the associated vehicle 1 to the object 3 in the travel direction A and the lateral displacement d_lat represents the distance from a middle axis of the associated vehicle 1 to the middle axis of the detected object 3 perpendicularly with respect to the travel distance A, as illustrated in FIG. 1.

The detection process is not limited to an object 3. On the contrary, several objects 3 can be detected and, under certain conditions, combined to form an object area OR. By way of example, two road users travelling adjacent to one another whose distance in one tolerance range is less than a width w0 of the associated vehicle 1 can be combined to form one object area OR and are thus treated as one object 3.

If an object 3 is detected in the environment 4 of the associated vehicle 1, then a determination is initially made as to whether the associated vehicle 1 is on a collision course with the detected object 3. For this purpose, it is possible, by way of example, to extrapolate the prevailing travel paths of the object 3 and of the associated vehicle 1 based upon the determined dynamic characteristics in order to detect whether the object 3 crosses the associated vehicle 1, by way of example within a previously defined period of time dt.

The detected object 3 can also be stationary. It can be a road sign, a stationary road user or also a traffic lane demarcation.

If it is established that the associated vehicle 1 is on a collision course with a detected object 3, then at least one avoidance criterion K_avoid is determined that indicates whether it is still theoretically possible for the driver of the associated vehicle 1 to drive around the detected object 3.

For this purpose, an avoidance trajectory T(k) is determined using a trajectory parameter k that preferably, based upon the distance L and the lateral displacement d_lat with respect to the detected object 3, describes a plausible avoidance path that the driver of the associated vehicle 1 drives along if an avoidance maneuver is performed at this point in time. In accordance with an embodiment of the present invention, the avoidance trajectory T(k) is assumed to be an S-shaped trajectory that describes an avoidance maneuver during which the associated vehicle 1 is aligned essentially the same prior to and after the avoidance maneuver, wherein the alignment relates to the vehicle path 5 of the associated vehicle 1 prior to the avoidance maneuver.

The travel path of the associated vehicle 1 is referred to as the vehicle path 5, taking into consideration the deviation of the associated vehicle 1, wherein not only the preceding travel path can be considered but rather a future travel path can also be extrapolated by virtue of a prediction process with reference to current vehicle data.

As illustrated in FIG. 1, the vehicle path 5 extends on a straight road essentially along an axis that lies parallel to the travel direction A so that an avoidance trajectory T(k) is determined wherein the associated vehicle 1 is aligned essentially parallel to the vehicle path 5 after the avoidance maneuver. In the case of an avoidance maneuver in a curve that has a constant curve radius R, the vehicle path 5 follows the curve profile (FIG. 4) and an avoidance trajectory T(k) is determined wherein the associated vehicle 1 is aligned essentially tangentially with respect to the vehicle path 5 after the avoidance maneuver, so that the associated vehicle 1 continues to follow the curve profile after the avoidance maneuver merely into another traffic lane, as illustrated in FIG. 4.

When determining the avoidance trajectory T(k), it is also possible to take into consideration movement of the object 3 in relation to the associated vehicle 1. As a consequence, the distance L that is taken into consideration as a parameter in the avoidance trajectory T(k) is not constant under certain conditions. Likewise, the lateral offset d_lat between the associated vehicle 1 and the object 3 is not constant. The two parameters can be taken into consideration when determining the avoidance trajectory. It is possible for this purpose, in particular with reference to the detected dynamic characteristics of the object 3, to prejudge how the object 3 is moving during the avoidance maneuver and to adjust the avoidance trajectory T(k) accordingly.

A sliding sine (see FIG. 2) can be used as an S-shaped avoidance trajectory T(k), wherein the sliding sine is produced by the function:

$$T(k)=a*k+b*\mathrm{Sin}(c*k),$$

wherein k represents the trajectory parameter, T(k) represents the avoidance trajectory based upon the trajectory parameters k, and a, b and c represent scale parameters that are based upon the distance L between the associated vehicle 1 and the object 3 and also upon the lateral displacement d_lat and the width w0 of the associated vehicle 1 and also upon the width w1 of the object 3.

Consequently, the avoidance trajectory T(k) comprises, as an additional term, a trigonometric function. In addition, the avoidance trajectory T(k) comprises a turning point WP that corresponds to a curvature change of the avoidance trajectory T(k) or to a change in the steering movement. In other words, during an avoidance maneuver, the vehicle driver turns the steering wheel relative to the initial steering movement first in one direction and then at the turning point WP turns the steering wheel in the other direction in order to return the associated vehicle 1 to its original alignment relative to the vehicle path 5. Since the sine is periodic in the function and only one avoidance maneuver is considered, only the first period of the sliding sine is considered, that is, values for k in an interval of 0 to 2*Pi or 0 to 360°.

Furthermore, the avoidance trajectory T(k) can be considered in different coordinate systems:

When driving in a straight line (FIG. 1), the avoidance trajectory T(k) is preferably described in Cartesian coordinates, wherein the trajectory parameter k of the x-coordinate and the function value T(k=x) corresponds to the y-coordinate and, in accordance with FIG. 2, the x-coordinate extends parallel to the travel direction A and the y-coordinate extends perpendicularly with respect to the direction A.

When negotiating a curve in which the avoidance trajectory T(k) changes from one curve radius R to another curve radius R+/−dy (see FIG. 4), wherein the curve radii R, R+/−dy each have the same zero point NP as a reference point (vehicle path change in a curve), the avoidance trajectory T(k) is preferably set in polar coordinates, wherein the trajectory parameter k corresponds to a circle angle phi and the function value T(Phi) corresponds to a circle radius r_kr that is produced by the distance of the associated vehicle 1 to the zero point NP of the curve. As a consequence, an avoidance maneuver in a curve that has an almost constant curve radius R can be described in simpler manner. The transition from Cartesian coordinates to polar coordinates is performed essentially by substituting x by Phi*R, so that the sliding sine T(Phi) in polar coordinates is essentially described by:

$$T(Phi)=r\_kr(Phi)=a*Phi*R{\sim}b*\sin(c*Phi*R)+R.$$

In order to scale the sliding sine to the respective driving situation of the associated vehicle 1 that is on the collision course, the scale parameters are selected such that the avoidance trajectory T(k) at k=L assumes the value (d_lat+ w0/2+w1/2+w_tol)=dy (width of the avoidance maneuver), wherein w0 and w1 represent the widths of the associated vehicle 1 or the object 3 respectively and w_tol represents a tolerance width. Consequently, an avoidance trajectory T(k) is produced in which the associated vehicle 1 is located after it has covered the distance L with a tolerance width w_tol adjacent to the object 3.

Taking into consideration that only one period of the sliding sine is considered and the distance L is to be achieved after one period, the avoidance trajectory is produced as:

$$T(x)=dy*x/L{\sim}dy/2Pi*\sin(2Pi*x/L) \qquad \text{(Equation 1)}$$

in Cartesian coordinates, and:

$$T(Phi)=dy*R*Phi/L{\sim}dy/2Pi*\sin(2Pi*R*Phi/L)+R \qquad \text{(Equation 2)}$$

(with phi∈L/R; T(0)=R; T(L/R)=R+/−dy) in polar coordinates. Hereinafter, the avoidance trajectory T(k) is considered independently from the coordinate system, in other words with the general trajectory parameter k.

If the avoidance trajectory T(k) is determined, it is still necessary to check whether it is possible for the associated vehicle 1 to perform an avoidance maneuver and change to this avoidance trajectory T(k). In particular, a maximum transverse acceleration a_max of the associated vehicle 1 is determined, so that a check can be performed as to whether the associated vehicle 1 would by way of example tip over when driving on the avoidance trajectory T(k).

For this purpose, a curvature Kappa(k) of the avoidance trajectory T(k) is initially determined and is produced from the reciprocal value of the radius R(k) at the site k of the avoidance trajectory T(k):

$$\mathrm{Kappa}(k)=1/R(k) \qquad \text{(Equation 3)}$$

The radius R(k) of the avoidance trajectory T(k) is produced in turn from the first and the second derivative of the avoidance trajectory T(k) after the trajectory parameter k:

$$R=(1+(dT(k)/dk)^2)^{3/2}/(d^2T(k)/dk^2) \qquad \text{(Equation 4)}$$

Under the assumption that the velocity of the associated vehicle 1 does not change during the avoidance maneuver, the maximum transverse accelerations a_quer also act on the associated vehicle 1 at the sites of the maximum curvature Kappa(k) of the avoidance trajectory T(k). However, even if the velocity of the associated vehicle 1 changes, that is, in the case of a positive or negative acceleration on the avoidance trajectory T(k), the positions of the maximum transverse acceleration a_max are displaced only to a minimal extent in relation to the positions of the maximum curvature. Therefore, the maximum transverse acceleration a_max can be determined in a good approximation from the extreme sites Kappa_max_1, Kappa_max_2 of the curvature Kappa (k). Two extreme sites Kappa max_1, Kappa_max_2 are produced in the case of an S-shaped avoidance trajectory T(k).

The extreme values Kappa_max_1, Kappa max_2 can be determined using Equation 3, with the aid of Equations 1 and 4, and the derivative Kappa'(k)=dy/dKappa*Kappa(k) is formed. The extreme values Kappa_max_1, Kappa max_2 are produced from the zero sites of the derivative Kappa' (k)=0, wherein the x-values x_max_1, x_max_2 of the extreme sites Kappa_max_1, Kappa_max_2 are used for the subsequent calculation of the maximum transverse acceleration a_max.

The transverse acceleration a_quer(k) of the associated vehicle 1 at the site k is produced from the formula:

$$a\_quer(k)=v(k)^2*\mathrm{Kappa}(k), \qquad \text{(Equation 5)}$$

wherein the velocity v(k) of the associated vehicle 1 after a travel path s has been covered on the avoidance trajectory T(k) under the assumption of a constant longitudinal acceleration a_long of the associated vehicle 1 in the travel direction A is produced by:

$$v(s)=\text{sqrt}((v\_0)^2+2*a\_long*s), \quad \text{(Equation 6)}$$

wherein v_0 is the velocity prior to the avoidance maneuver, a_long is the longitudinal acceleration in the travel direction A and s is the distance covered from the start of the avoidance maneuver.

Consequently, two solutions for the maximum transverse acceleration are produced using Equations 5 and 6:

$$a\_max=((v\_0)^2+2*a\_long*s))*\text{Kappa\_max}\_½, \quad \text{(Equation 7)}$$

wherein, of the two solutions for a_max, only the one with the higher value is relevant for the subsequent method steps.

In order to determine the covered distance s, the avoidance trajectory T(k) is approximated in accordance with FIG. 3 in a linear manner between the extreme sites Kappa_max_1, Kappa max_2 and the turning point WP, so that, according to a simple geometric consideration, the distance s is produced from the connecting straight lines 1_i, i=1, . . . 4 over the x- and y-coordinates of the extreme points Kappa_max_1, Kappa_max_2 and the turning point WP. The points P_i, i=1 . . . 4 in accordance with FIG. 3 are produced by:

$$P\_=(x\_max\_,T(x\_max\_1))$$

$$P2=(L/2,dy/2)$$

$$P\_3=(x\_max\_2,T(x\_max\_2))$$

$$P\_4=(L,dy)$$

The distances s between the points P_i are produced from the coordinates of the points P_i, so that the maximum transverse acceleration a_max can be determined with the aid of Equation 7, wherein the longitudinal acceleration a_long vehicle interior is measured by the sensor system 2.3. It is preferably taken into consideration whether the longitudinal acceleration a_long is constant at the point in time when it is considered or whether it changes, in other words, the associated vehicle maintains its velocity v or does not maintain its velocity.

If the associated vehicle 1 accelerates (a_long>0), then a greater transverse acceleration a_quer is to be expected at the second extreme site Kappa_max_2 than at the first extreme site Kappa_max_1. Consequently, the distance up to the point P_3 (s=l_1+l_2+l_3) is relevant as the distance s in Equation 7. If the associated vehicle 1 does not accelerate during the avoidance maneuver (a_long=0), the transverse accelerations a_quer at the two points P_1 and P_3 are equal, the distance s can therefore be selected accordingly (s=l_1 or s=l_1+l_2+l_3). If the associated vehicle 1 is braked (a_long<0), then only the maximum transverse acceleration a_max is decisive at the point P_1, that is, s=l_1 applies in Equation 7.

If a maximum transverse acceleration a_max is determined, then a check is performed as to whether this determined maximum transverse acceleration a_max exceeds a threshold value a_thresh. The threshold value a_thresh can be selected, for example, such that the associated vehicle 1 does not tip over if the threshold value is exceeded. Consequently, it is possible, based upon the determined avoidance trajectory T(k), to check whether it is at all possible for the associated vehicle 1 to perform an avoidance maneuver safely on this avoidance trajectory T(k). It is also possible to use multiple threshold values a_thresh in order to take into consideration further safety parameters. In particular, tolerance limits can be provided so that in the case of a first threshold value a_thresh_1 being exceeded, the first threshold value being less than a second threshold value a_thresh_2, for example, a warning signal S6 is initially output to the driver to warn in good time that an avoidance maneuver is no longer possible in the near future. Only when the transverse acceleration a_quer also exceeds a second threshold value a_thresh_2 is a brake signal S5 transmitted to the brake system 2.4.

Consequently, the avoidance trajectory T(k) is used to check an avoidance criterion K_avoid that is fulfilled if it is still theoretically possible for the driver to initiate an avoidance maneuver. Only when the avoidance criterion is no longer fulfilled is an activation criterion K_act fulfilled. In the case of the activation criterion being fulfilled, signals S4 are transmitted, for example, by the ECU 2.5 to the brake system 2.4 in order to initiate a brake application. Prior to an automatic brake application being initiated, additional braking criteria K_brake can be checked in order to ensure that there are no longer any other options of avoiding the collision. In particular, it is possible to check whether the driver is still able to apply the brakes, whether the driver has already initiated a brake application or whether the longitudinal acceleration a_long exceeds a defined value.

In addition, a vehicle path criterion K_F that takes into consideration in part areas where the vehicle overlaps with the object 3 can be set.

Figure 5:
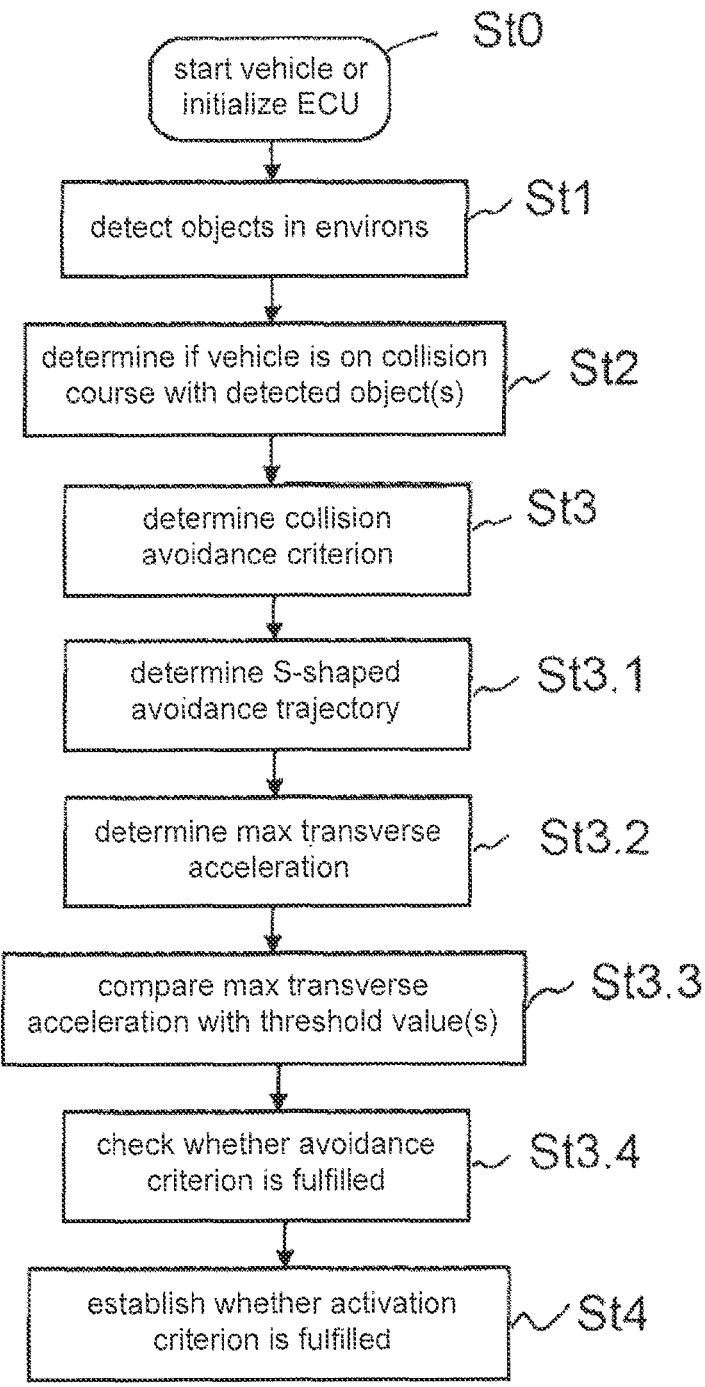
FIG. 5 is a flow chart illustrating process steps in a method for determining a brake application activation criterion in accordance with an embodiment of the present invention.

Referring now to FIG. 5, which is a flow chart of a method for determining a brake application activation criterion in accordance with an embodiment of the present invention, the associated vehicle 1 is started or the ECU 2.5 is initialized at step St0.

In step St1, an environment 4 of the associated vehicle 1 is initially observed, for example by means of the camera system 2.1 and supported by the proximity sensors 2.2. In the case of an object 3 being detected, the correspondingly received signals S1 and S2 are either processed in a processing unit of the camera system 2.1 or of the proximity sensors 2.2 or the signals S1, S2 are transmitted to the ECU 2.5.

In step St2, it is determined with the aid of the signals S1, S2 whether the associated vehicle 1 is on a collision course with the object 3. For this purpose, dynamic characteristics of the object 3 are determined from the signals S1, S2 and compared with the driving dynamic characteristics of the associated vehicle, the driving dynamic characteristics being determined by the sensor system 2.3.

If the associated vehicle 1 is on a collision course with the object 3, then an avoidance criterion K_avoid is determined in step St3 and the avoidance criterion indicates whether it is still possible for the driver of the associated vehicle 1 to perform an avoidance maneuver. For this purpose, an S-shaped avoidance trajectory T(k) is determined in step 3.1 with the aid of the distance L and the avoidance maneuver width dy that is produced from the lateral displacement d_lat and the widths w0, w1 of the associated vehicle 1 or the object 3 respectively, and the S-shaped avoidance trajectory is preferably described by means of a sliding sine (Equations 1, 2).

In step 3.2, a maximum transverse acceleration a_max is subsequently determined that acts on the associated vehicle 1 if the vehicle moves in the future on the avoidance trajectory T(k). Subsequently, this determined maximum transverse acceleration a_max is compared in step 3.3 with at least one threshold value a_thresh. A check is then performed in step 3.4 as to whether, based upon the threshold value a_thresh, the avoidance criterion K_avoid is fulfilled. Consequently, a plausibility check is performed as to whether the associated vehicle 1 can also perform an avoidance maneuver safely on the determined avoidance trajectory T(k) and would not, for example, tip over as a result of an excessively high transverse acceleration a_quer acting on the associated vehicle 1.

If the avoidance criterion K_avoid is fulfilled, that is, if it is still possible for the driver to perform an avoidance maneuver, then it is established in step 4 that the activation criterion K_act for the brake application is not fulfilled. Consequently, as long as it is possible to perform an avoidance maneuver, the ECU 2.5 does not transmit a signal S5 to the brake system 2.4. It is thus possible to ensure that a brake application is not initiated without cause and the driver is still able to intervene for as long as is theoretically possible.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for automatically activating a brake application in a vehicle having a brake system, the method comprising:
   using at least one detection device, detecting at least one object in the environment of the vehicle; and
   using at least one processor:
      determining whether the vehicle is on a collision course with the at least one object,
      when the vehicle is on a collision course with the at least one object, determining an S-shaped avoidance trajectory of the vehicle and at least one avoidance criterion based at least in part on the S-shaped avoidance trajectory,
      determining at least one extreme value of a transverse acceleration of the vehicle from the S-shaped avoidance trajectory,
      comparing the at least one extreme value with a first transverse acceleration threshold value and a second transverse acceleration threshold value
      outputting a brake warning signal when the at least one extreme value exceeds the first transverse acceleration threshold but falls below the second transverse acceleration threshold value, and
      outputting a brake control signal to the brake system to automatically effect activation of the brake application in the vehicle when the at least one extreme value exceeds the second transverse acceleration threshold value.

2. The method as claimed in claim 1, wherein the S-shaped avoidance trajectory is described as a function of trajectory parameters that are coordinates of a coordinate system.

3. The method as claimed in claim 2, wherein the coordinates of the coordinate system are polar coordinates.

4. The method as claimed in claim 2, wherein the coordinates of the coordinate system are Cartesian coordinates.

5. The method as claimed in claim 2, wherein the S-shaped avoidance trajectory is differentiated at least twice continuously according to at least one trajectory parameter.

6. The method as claimed in claim 2, wherein the S-shaped avoidance trajectory comprises a turning point as a function of at least one trajectory parameter.

7. The method as claimed in claim 1, wherein the S-shaped avoidance trajectory comprises a trigonometric function.

8. The method as claimed in claim 7, wherein the trigonometric function is applicable only for a first time interval of one of 0 to 2*Pi and 0° to 360°.

9. The method as claimed in claim 1, wherein a second derivative of the S-shaped avoidance trajectory comprises a trigonometric function.

10. The method as claimed in claim 2, wherein the S-shaped avoidance trajectory is produced according to a function T(k)=a*k+b*sin(c*k), wherein k is a trajectory parameter, T(k) is a trajectory based upon the trajectory parameter k, and a, b and c are scale parameters that are based upon (i) a distance between the vehicle and the at least one object, (ii) a lateral displacement between the vehicle and the at least one object, and (iii) a width of the vehicle and the at least one object.

11. The method as claimed in claim 10, wherein the distance between the vehicle and the at least one object is based on at least one of (i) a change in the distance as a result of associated movement of the at least one object during an avoidance maneuver calculated using the S-shaped avoidance trajectory and (ii) a lateral displacement between the vehicle and the at least one object at a point in time at which the vehicle arrives at the at least one object in the S-shaped avoidance trajectory.

12. The method as claimed in claim 1, further comprising determining at least one of (i) at least one brake criterion and (ii) a vehicle path criterion, and outputting the brake control signal to the brake system to automatically effect activation of the brake application in the vehicle only when the at least one extreme value exceeds the second transverse acceleration threshold value and at least one of the at least one brake criterion and the vehicle path criterion is also fulfilled.

13. The method as claimed in claim 12, further comprising activating the at least one brake criterion when a longitudinal acceleration value of the vehicle is exceeded.

14. The method as claimed in claim 12, further comprising activating the vehicle path criterion when a vehicle path threshold value is exceeded by the vehicle.

15. The method as claimed in claim 1, further comprising combining multiple adjacent ones of the at least one object to form one common object area, wherein a distance between adjacent ones of the at least one object is less than one of a width and scaled width of the vehicle.

16. An emergency brake system for a vehicle, the system comprising a camera system; a proximity sensor; a sensor system; a primary brake system; and an ECU configured to effect the method according to claim 1.

17. A vehicle, comprising an emergency brake system, the emergency brake system including a camera system, a proximity sensor, a sensor system, a primary brake system, and an electronic control unit (ECU) configured to effect the method according to claim 1.

18. The method as claimed in claim 3, wherein the polar coordinates are a circle radius and a circle angle.

19. The method as claimed in claim 5, wherein the at least one trajectory parameter includes one of a circle angle and an x-coordinate.

20. The method as claimed in claim 6, wherein the at least one trajectory parameter includes one of a circle angle and an x-coordinate.

21. The method as claimed in claim 14, wherein the vehicle path criterion is activated when the vehicle path of the vehicle overlaps with the at least one object.

22. A method for automatically activating a brake application in a vehicle having a brake system, the method comprising:

using at least one detection device, detecting at least one object in the environment of the vehicle; and using at least one processor:
determining whether the vehicle is on a collision course with the at least one object,
when the vehicle is on a collision course with the at least one object, determining an S-shaped avoidance trajectory of the vehicle and at least one avoidance criterion based at least in part on the S-shaped avoidance trajectory,
determining at least one extreme value of a transverse acceleration of the vehicle from the S-shaped avoidance trajectory,
determining whether the at least one avoidance criteria is fulfilled by comparing the at least one extreme value with at least one threshold value, wherein the avoidance criteria is fulfilled when the at least one extreme value falls below the at least one threshold value, and
activating an automatic brake application in the vehicle when an activation criterion for the automatic brake application is fulfilled, wherein the activation criterion for the automatic brake application is not fulfilled as long as the at least one avoidance criterion is fulfilled, wherein the S-shaped avoidance trajectory is produced according to a function $T(k)=a*k+b*\sin(c*k)$, wherein k is a trajectory parameter, $T(k)$ is a trajectory based upon the trajectory parameter k, and a, b and c are scale parameters that are based upon (i) a distance between the vehicle and the at least one object, (ii) a lateral displacement between the vehicle and the at least one object, and (iii) a width of the vehicle and the at least one object.

23. A method for automatically activating a brake application in a vehicle having a brake system, the method comprising:

using at least one detection device, detecting multiple objects in the environment of the vehicle;

determining that a distance between adjacent ones of the multiple objects is less than one of a width and a scaled width of the vehicle, and in response, combining the multiple objects to form one common object area, and using at least one processor:
determining whether the vehicle is on a collision course with the common object area,
when the vehicle is on a collision course with the common object area, determining an S-shaped avoidance trajectory of the vehicle and at least one avoidance criterion based at least in part on the S-shaped avoidance trajectory,
determining at least one extreme value of a transverse acceleration of the vehicle from the S-shaped avoidance trajectory,
determining whether the at least one avoidance criteria is fulfilled by comparing the at least one extreme value with at least one threshold value, wherein the avoidance criteria is fulfilled when the at least one extreme value falls below the at least one threshold value, and
activating an automatic brake application in the vehicle when an activation criterion for the automatic brake application is fulfilled, wherein the activation criterion for the automatic brake application is not fulfilled as long as the at least one avoidance criterion is fulfilled.

* * * * *

UNITED STATES PATENT AND TRADEMARK OFFICE
CERTIFICATE OF CORRECTION

| | | |
|---|---|---|
| PATENT NO. | : 10,046,761 B2 | Page 1 of 1 |
| APPLICATION NO. | : 14/762524 | |
| DATED | : August 14, 2018 | |
| INVENTOR(S) | : Ruediger Meyer, Dirk Sandkuehler and Christian Sulzbacher | |

It is certified that error appears in the above-identified patent and that said Letters Patent is hereby corrected as shown below:

On the Title Page

The inventor whose name reads "Rudiger Meyer" should read --Ruediger Meyer--.

The inventor whose name reads "Dirk Sandkuhler" should read --Dirk Sandkuehler--.

Signed and Sealed this
Fifth Day of February, 2019

Andrei Iancu
*Director of the United States Patent and Trademark Office*